US008360501B2

(12) United States Patent
Zentner

(10) Patent No.: US 8,360,501 B2
(45) Date of Patent: Jan. 29, 2013

(54) TANK FLAP MODULE FOR A MOTOR VEHICLE

(75) Inventor: Christian Zentner, Wiesbaden (DE)

(73) Assignee: GM Global Technology Operations LLC, Detroit, MI (US)

(*) Notice: Subject to any disclaimer, the term of this patent is extended or adjusted under 35 U.S.C. 154(b) by 288 days.

(21) Appl. No.: 12/775,388

(22) Filed: May 6, 2010

(65) Prior Publication Data

US 2010/0301055 A1    Dec. 2, 2010

(30) Foreign Application Priority Data

May 26, 2009  (DE) .......................... 10 2009 022 485

(51) Int. Cl.
*B60K 15/05* (2006.01)
*E05D 11/06* (2006.01)
*E05F 5/00* (2006.01)
(52) U.S. Cl. ................... 296/97.22; 16/375; 280/853
(58) Field of Classification Search ............. 16/82, 85, 16/86 A, 255, 374, 375; 220/86.2, 905, DIG. 33; 280/834, 853; 296/97.22, 146.11, 207
See application file for complete search history.

(56) References Cited

U.S. PATENT DOCUMENTS

| 791,779 | A | * | 6/1905 | Heiser ........................... 220/324 |
| 1,211,366 | A | * | 1/1917 | Fisher ............................. 16/375 |
| 3,550,951 | A | * | 12/1970 | Cobbs .......................... 296/152 |
| 3,643,755 | A | * | 2/1972 | Gionet et al. ............. 180/69.21 |
| 5,836,638 | A | * | 11/1998 | Slocum ...................... 296/97.22 |
| 5,906,405 | A | * | 5/1999 | Cooper ..................... 296/97.22 |
| 6,189,959 | B1 |   | 2/2001 | VanAssche et al. |
| 6,702,357 | B2 | * | 3/2004 | Joerg et al. .................. 296/97.22 |
| 7,311,348 | B1 | * | 12/2007 | Bang .......................... 296/97.22 |
| 7,566,089 | B2 | * | 7/2009 | Alfaro ........................ 296/97.22 |
| 2011/0175389 | A1 | * | 7/2011 | Franz ......................... 296/97.22 |

FOREIGN PATENT DOCUMENTS

| CN | 1706683 A | 12/2005 |
| DE | 4307454 C1 | 4/1994 |
| DE | 4304922 A1 * | 8/1994 |
| DE | 19827194 A1 | 12/1999 |
| DE | 10338820 A1 | 3/2005 |
| DE | 202004017791 U1 | 3/2006 |
| DE | 102005051140 A1 | 5/2007 |
| DE | 102006015404 A1 | 10/2007 |
| EP | 1138541 A2 | 10/2001 |
| EP | 1508465 B1 | 4/2008 |
| EP | 2127933 A1 | 12/2009 |
| JP | 63097422 A * | 4/1988 |
| JP | 2007269258 A * | 10/2007 |
| JP | 2010203208 A * | 9/2010 |
| KR | 20040054262 A | 6/2004 |

* cited by examiner

*Primary Examiner* — Glenn Dayoan
*Assistant Examiner* — Paul Chenevert
(74) *Attorney, Agent, or Firm* — Ingrassia Fisher & Lorenz, P.C.

(57) ABSTRACT

A tank flap module is provided for installation in a motor vehicle with a trough body having a bottom section which in final assembly position on the motor vehicle is located on the inside and provided with a through-opening for a fuel filler neck and a mounting section for the swivel-mounting of a swivel arm of a tank flap arranged laterally thereto. The swivel arm is swivel-mounted on the trough body between two end positions. On the inside of the mounting section at least one noise-dampening end stop element is arranged which interacts with the swivel arm or a counter stop element arranged thereon.

9 Claims, 5 Drawing Sheets

TANK FLAP MODULE FOR A MOTOR VEHICLE

CROSS-REFERENCE TO RELATED APPLICATION

This application claims priority to German Patent Application No. 102009022485.8, filed May 26, 2009, which is incorporated herein by reference in its entirety.

TECHNICAL FIELD

The present invention relates to a tank flap module for installation in a motor vehicle with a trough body and a tank flap hinged to the trough body.

BACKGROUND

Tank flap modules for installation in motor vehicles are sufficiently known in the prior art. The tank flap module described for example in DE 10 2005 051 140 A1 has a pot-shaped trough body which is substantially constructed of a rigid outer pot element producible through injection-molding and an elastic bottom apron molded on to the pot element.

On a back side of the trough body facing away from the inner side of the tank trough a trough body expansion is attached in which a swivel arm of a swivel mechanism for swiveling a tank flap is partially accommodated. The swivel arm, which on an end carries the tank flap, is swivel-mounted with its other end on a swivel bearing arranged in the trough body expansion.

Furthermore, a circumferential rim formed as rim flange is formed on the trough body opposite the bottom apron. The rim can for example be rubberized. the rubberizing of the rim flange, in addition to a sealing function, can also ensure a reduction of the closing noise of the tank flap.

Tank flaps of known tank flap modules are typically swivel-mounted to the tank flap module between two end positions, namely an opening position and a closing position. The opening movement of a tank flap is limited to that extent. However, disturbing noises frequently occur in practice not only when closing a tank flap but also when opening said tank flap on reaching an opening end position.

In view of the foregoing, at least one object is to make available a tank flap module which particularly when opening the tank flap is subject to less noise development. It is also an object of the invention to make available a noise dampening for a tank flap module preferably cost-neutrally and without additional effort in terms of production and assembly worth mentioning. Furthermore, other objects, desirable features, and characteristics will become apparent from the subsequent summary and detailed description, and the appended claims, taken in conjunction with the accompanying drawings and this background.

SUMMARY

The at least one object, other objects, desirable features and characteristics is solved with a tank flap module, a motor vehicle, as well as a manufacturing method for a tank flap module. The tank flap module is intended for installation in a motor vehicle. It comprises a trough body which in the area of a mostly elastically formed and elastically deformable bottom section comprises a through opening to accommodate a fuel filler neck. The trough body has a pot-shaped basic geometry wherein the bottom section forming a depression upon reaching of a final assembly position comes to bear against a recess on the vehicle or body offset from the body outer panel to the inside.

On the side of the through opening the trough body comprises a mounting section acting as hinge housing for the swivel-mounting of a swivel arm of a tank flap. That mounting section can preferably be joined as one piece with the trough body or be embodied as a lateral trough body expansion. The swivel arm is typically swivel-mounted on the trough body or on its mounting section between two end positions, namely an opening and a closing position.

For noise reduction and for dampening opening and/or closing noises of the tank flap at least one noise-dampening end stop element is arranged on the inner side of the mounting section. This end stop element is configured to interact with the swivel arm connected with the tank flap or a counter stop element for noise dampening of the opening and/or closing movement of the swivel arm arranged thereon. Through the arrangement of a noise dampening stop element located inside a striking noise usually generated on reaching the opening position of the tank flap can more preferably also be dampened in an advantageous manner. Such an end stop element dampening at least the opening movement of a tank flap imparts a value-creating and high-quality overall impression to the entire tank flap module.

According to a first embodiment it is provided that the stop element is joined to the trough body by way of shape, force or material. In principle, different types of fastening options are possible for the stop element, for example clipping into a mounting provided for this purpose, screwing on or gluing on, but more preferably direct molding of the end stop element to the trough body. The size and expansion of the end stop element as well as its positioning are adapted to the shaping of the counter stop element of the swivel arm and/or its positioning relative to the stop element.

To achieve an advantageous dampening effect it is more preferably provided that the end stop element is produced of an elastically deformable material, for example of a natural or synthetic rubber, caoutchouc or thermoplastic elastomer comparable in its effect.

According to a further embodiment it is provided that the stop element is arranged in or on a depression provided on the inner side of the mounting section of the trough body or a correspondingly formed inner-side recess of the mounting section. Here it can more preferably be provided that the end stop element is integrated flush with the surface in the inner side of the mounting section or in its inner wall.

To this extent, the arrangement of the end stop element can be integrated in an existing tank flap module design without fundamental design changes for example in that a wall area of the mounting section which with opened tank flap is located opposite a counter stop element arranged on the swivel arm is provided with a recess or depression or clearance which, to restore the original basic geometry of the wall of the mounting section is provided, more preferably filled, with a noise-dampening material which henceforth acts as stop element.

According to another embodiment, it is provided that the end stop element and the counter stop element or a section of the swivel arm abutting the end stop element on reaching the opening position of the tank flap are manufactured of different materials. Here it is more preferably provided that those materials have different moduli of elasticity. It is more preferably provided that the different materials on striking each other generate a preferably quiet or dampened noise.

The end stop element according to an embodiment is molded on to the inside of the mounting section. Here it is more preferably provided to produce the end stop element as part of an injection-molding process and in the process fasten said end stop element in the position on the inner side of the mounting section of the trough body intended for this purpose.

Such manufacture or assembly of the end stop element turns out to be an advantage to the extent that the trough body itself is to be preferentially manufactured as injection-molded component. To this extent it can be provided to manufacture the trough body including its mounting section formed as hinge housing and end stop element to be fastened thereto on the inside in a two or multi-component injection-molding process.

Since the manufacture of a tank flap module is usually performed according to the injection-molding method anyway the stop element, through suitable adaptation of the injection-molds required for this purpose, can be manufactured almost cost-neutrally and fastened to the mounting section at a point provided for this purpose without possible additional or separate assembly steps being required to do so.

It is further provided that the stop element is produced of a thermoplastic elastomer which comprises the noise-dampening characteristics for the intended purpose. The trough body, at least its pot element and/or hinge housing are typically produced of a comparatively hard plastic, for example polypropylene. The trough body, particularly its pot element and its lateral trough body expansion acting as mounting section can also be embodied in a fiber-reinforced more preferably glass-fiber reinforced manner.

Furthermore it proves to be an advantage if the end stop element is substantially manufactured of ethylene-propylene-diene-rubber (EPDM), comprises an EPDM component that is adequate for providing adequate acoustic dampening characteristics or entirely consists of EPDM.

According to a further advantageous configuration of the invention it is provided that the trough body of the tank flap module facing away from the bottom section comprises a flange section typically expanded radially to the outside which in final assembly position on the motor vehicle comes to lie in a mounting opening of a body panel. Advantageously, this flange section is provided with a sealing lip of an elastically deformable material. The flange section can further be embodied as a circumferential flange with a corresponding circumferential sealing lip.

Similar to the end stop element provided inside on the mounting section the use of a thermoplastic elastomer, more preferably EPDM, can also be possible for the sealing lip.

More preferably with such configurations, wherein the tank flap module is producible by means of a two or multi-component injection-molding process it can be provided to injection-mold the sealing lip as well as the end stop, or the end stop element on to a trough body that already exists or that was produced in a previous injection-molding process in one and the same injection-molding process.

According to a further embodiment, it can be additionally provided to embody the end stop element and the sealing lip in one piece and/or to fasten the end stop element and the sealing lip on the trough body in a manner joining each other. The end stop element for example can be embodied as an extension of the sealing lip protruding to the inside.

Thus it is fundamentally conceivable to provide the preferentially circumferential sealing lip with a strap-like extension that protrudes to the inside and at least in certain regions encloses the flange section of the trough body or the mounting section, which extension comes to lie in said region of the inner side of the mounting section against which either the fold-out swivel arm itself or counter stop elements arranged thereon come to bear when opening the tank flap.

In addition it is provided according to the invention that the end stop element, the sealing lip and/or the trough body can be produced by means of a two or multi-component injection-molding process. Here it is more preferably provided to injection-mold the trough body more preferably its pot element and its hinge housing section of a comparatively solid plastic and in a following injection-molding process to injection-mold the sealing lip and if applicable also the bottom apron, which comprises the through opening for the fuel filler neck typically consisting of a flexible plastic of one and the same material, on to the trough body.

For joining or molding the end stop element on to the inner side of the hinge housing section of the trough body more preferably an overflow channel can be provided in the injection-mold, by means of which the comparatively soft plastic component can be attached to the inner side of the hinge housing section. Thus the relatively hard component of the hinge housing on the inside can be covered in certain regions with a soft or comparatively elastic soft component forming the end stop element.

According to a further embodiment, a motor vehicle equipped with the tank flap module.

In addition a method for the manufacture of a previously described tank flap module by means of a two or multi-component injection-molding process is provided. Here, a sealing lip enclosing or at least in certain regions encasing the flange as well as on the inner side of the trough element an end stop element are injection-molded on to an existing trough body or such a trough body to be produced and comprising a mounting flange.

It turns out to be an advantage if both the sealing lip and the end stop element are injection-molded on to the trough body in one operation, which is in a common injection-molding operation.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
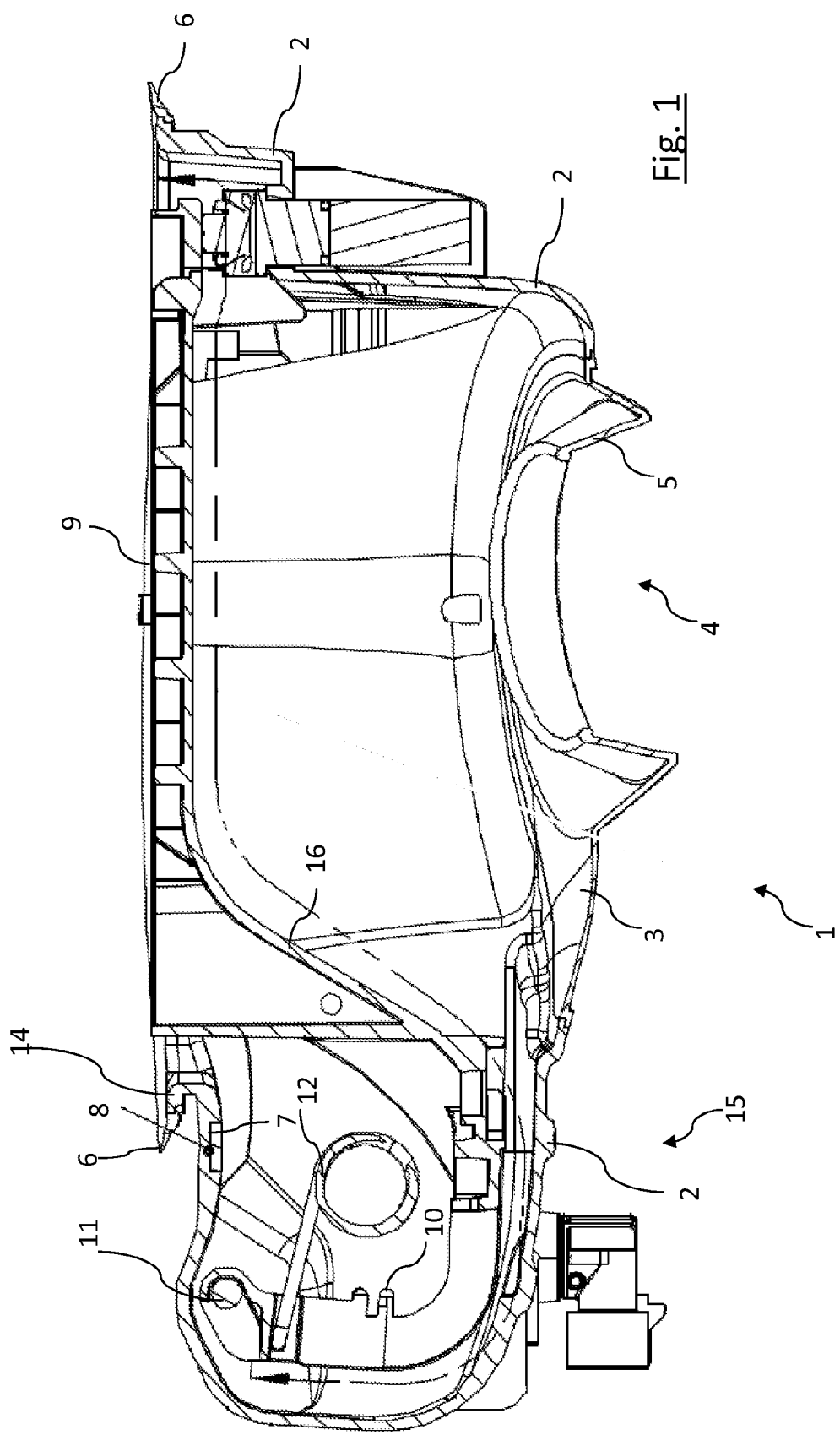
FIG. 1 is a perspective and partly cut view of the tank flap module according to an embodiment of the invention with the tank flap in closing position.
Figure 2:
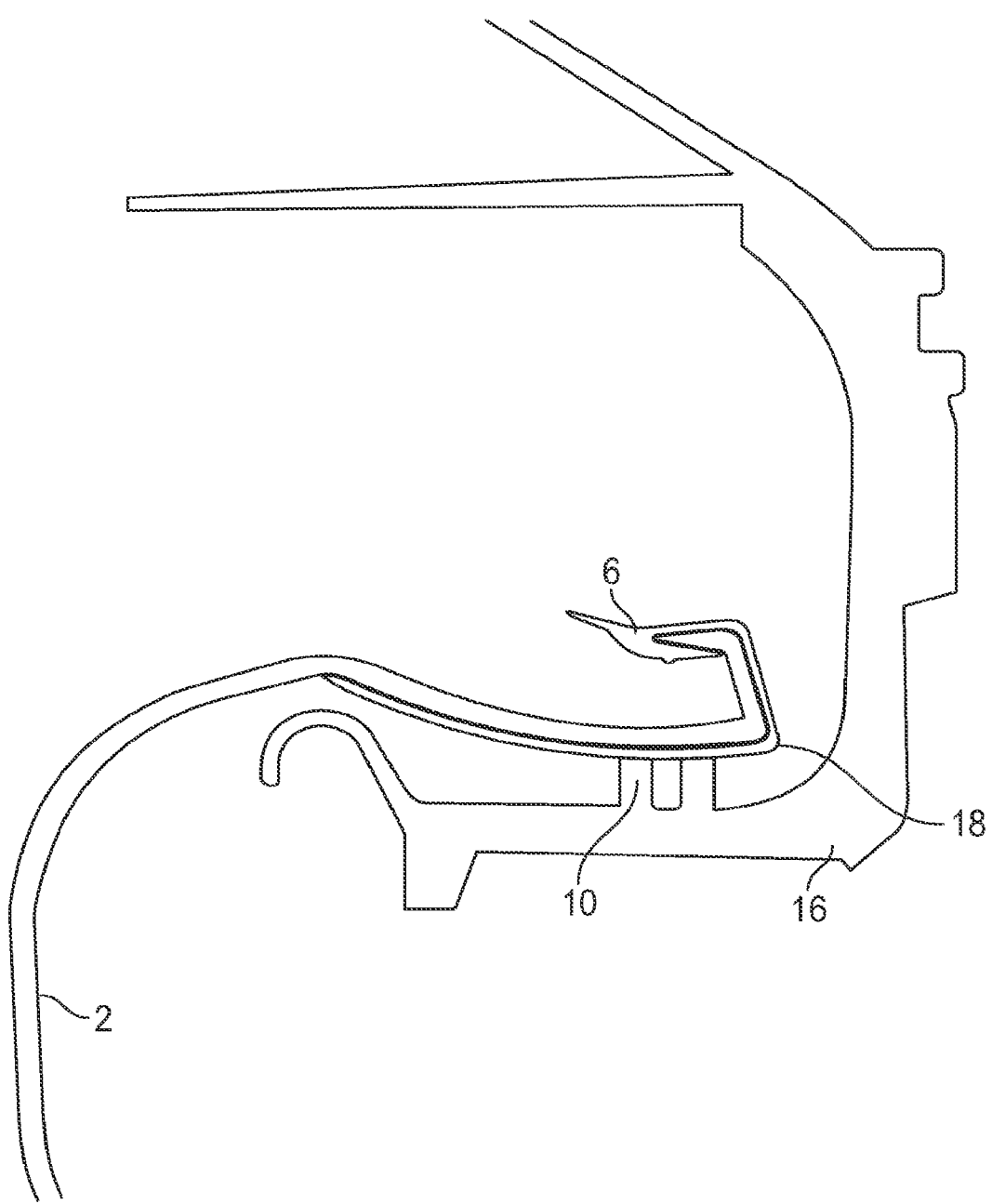
FIG. 2 is a schematic and detailed view of the tank flap module according to a further embodiment.
Figure 3:
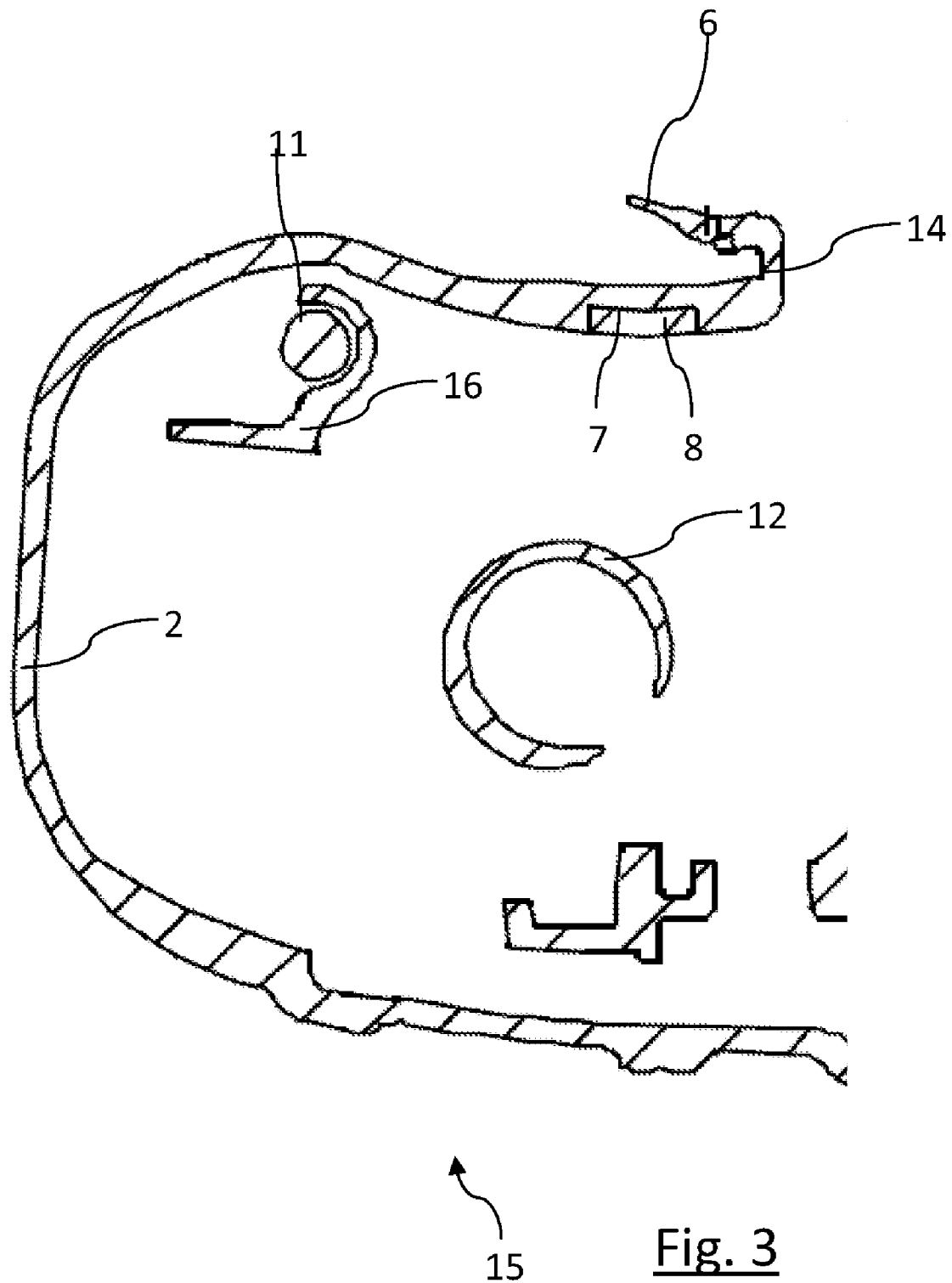
FIG. 3 is an enlarged and cut view of the mounting section of the trough body according to FIG. 1.
Figure 4:
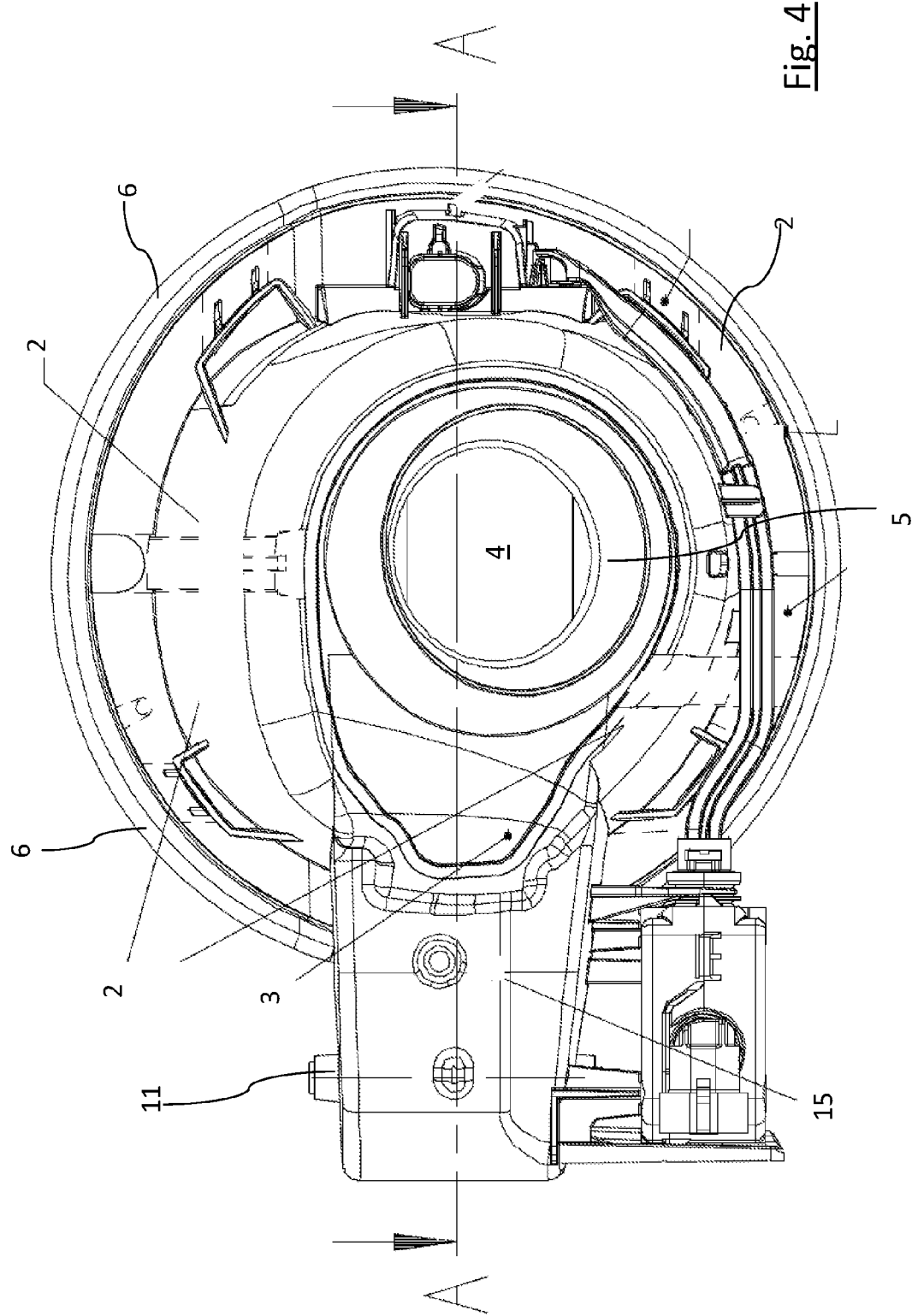
FIG. 4 the tank flap module according to FIG. 1 in a top view seen from the vehicle inside.
Figure 5:
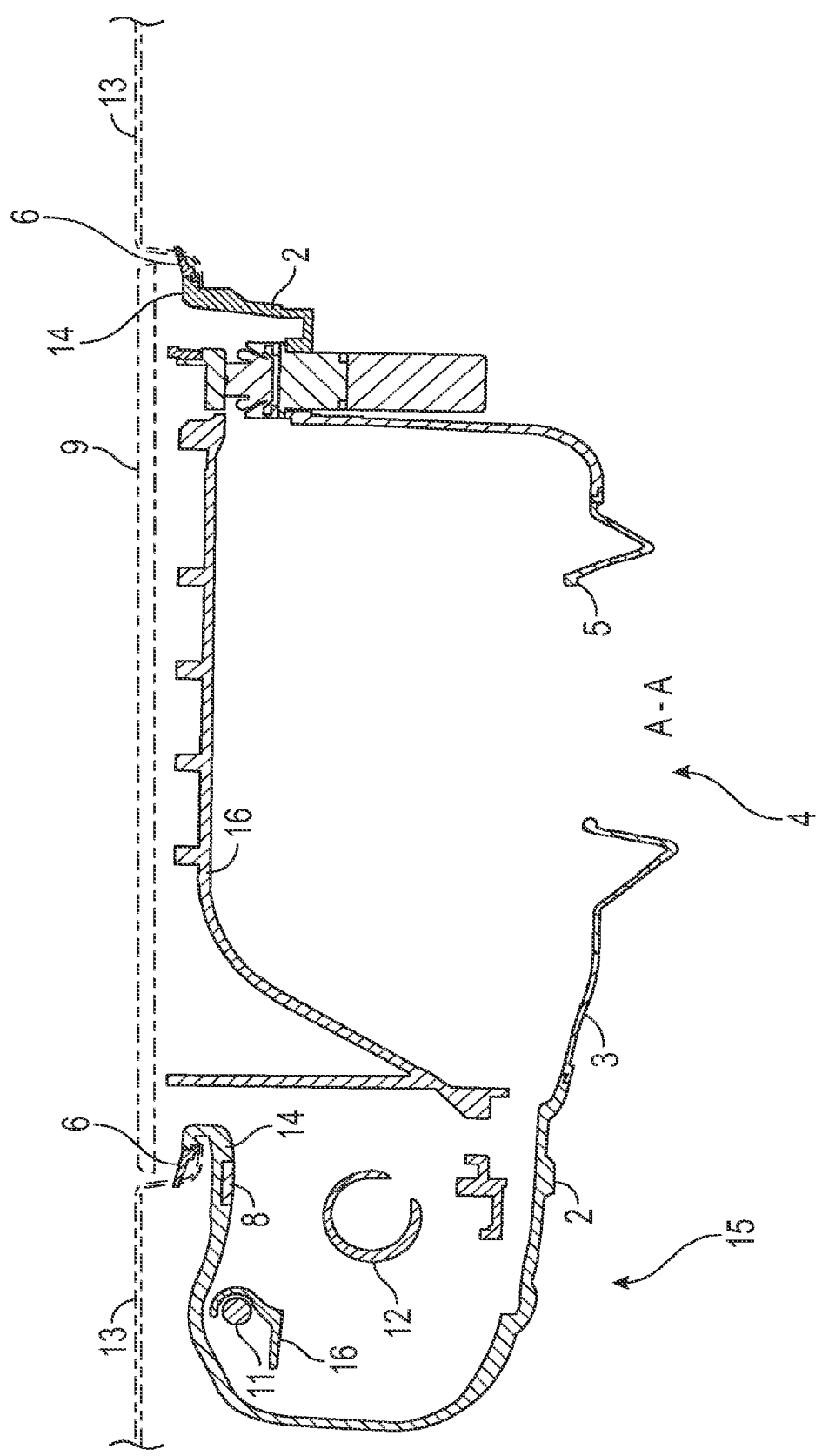
FIG. 5 a cross-sectional view of the tank flap module along the section line A-A of FIG. 4 in installation position on the motor vehicle.

The tank flap module 1 shown in FIG. 1 to FIG. 5 comprises a trough body 2 which is substantially embodied pot-shaped and which in a region shown in FIG. 1, FIG. 4 and FIG. 5 on the left comprises a hinge housing section 15 to accommodate a hinge or a swivel arm 16 rotatably mounted on a swivel axis 11, which with one end is hinged on the axis of rotation 11 and on the other end is connected with the tank flap 9 located at the top in FIG. 1 and FIG. 5. Located at the bottom in FIG. 1 and FIG. 5 and in installation situation facing towards the vehicle inside, the trough body 2 comprises a bottom section 3 with a through-opening 4 for a fuel filler neck.

The pot element 2 as well as the hinge housing section 15 acting as hinge housing and the bottom section 3 can be produced through an injection-molding method, more preferably a multi-component injection-molding method. While the pot element 2 and its hinge housing section 15 comprise a comparatively rigid and inflexible plastic material, for example polypropylene, a comparatively soft and elastically deformable plastic material, preferentially EPDM is provided for the bottom section 3.

The choice of a flexible material for the bottom section 3, in conjunction with the geometric configuration of the rim section 5 adjoining the through-opening 4, more preferably through its bellows-like configuration, allows a flexibly adaptable mounting for the fuel filler neck.

Located opposite the through-opening 4 formed on the bottom section 3 a tank flap 9 shown in closing position in FIG. 1 and FIG. 5 is hinged in the hinge housing section 15. The swivel arm 16 connected with the tank flap 9 is curved S-like in cross section. The axis of rotation 11 is thus arranged within the hinge housing section 15 in the in FIGS. 1 and 5 upper section directed towards the vehicle outside. Through the S-like curved configuration of the swivel arm 16 the axis of rotation 11 can be arranged almost invisible from the outside and laterally offset from a mounting opening of the body panel 13.

The trough body 2 on its end sections located at the top in FIG. 1 and FIG. 5 and facing to the body outside comprises a fastening flange 14 with which the tank flap module 1 comes to lie in final assembly position in a mounting formed by the body panel 13. On to the circumferential flange section 14 facing radially to the outside a circumferential sealing lip 6 of a thermoplastic elastomer is injection-molded, which, as shown in FIG. 5 in cross section, flexibly hugs the rim of the mounting opening of the tank flap module formed by the body panel 13.

The tank flap or the tank flap 9 can be engaged and locked in a manner not explained in more detail in the closing position shown in FIG. 1 and FIG. 5 and can be equally manually and/or with the support of a driving device be swiveled to and fro between the closing position shown in FIG. 1 and an opening position hinted in FIG. 2.

The swivel movement of the swivel arm 16 can be effected with or against a spring force made available by a spring element 12. The spring element 12 can more preferably be used as resetting element either for closing or opening of the tank flap 9.

The entire swivel arm 16 comparable with the trough body 2 can also be embodied as injection-molding component. In the basic or closing position shown in FIG. 1, counter stop elements 10 facing in vehicle longitudinal direction are formed on the swivel arm 16 which on reaching the opening position of the tank flap 9 hinted in FIG. 2 come to bear against the inside of the hinge housing section 15 of the trough body 2.

For noise dampening of this striking-together of swivel arm 16 or counter stop elements 10 on the one hand and the trough body 2 on the other hand the trough body in the region of its hinge housing section 15 on the inside is provided with a stop element 8, 18 at least in certain regions, which in the view according to FIG. 2 encloses the flange section 14 on its inside and furthermore merges as one piece with the circumferential sealing lip 6.

In the configuration according to FIG. 2 the end stop element 18 is formed as a comparatively thin layer of a thermoplastic elastomer while in the configuration according to FIG. 1, FIG. 3 and FIG. 5 the stop element 8 is joined almost flush with the surface in a clearance or depression 7 on the inside of the hinge housing section 15 (i.e., mounting section) of the trough body 2 provided for this purpose.

The geometrical configuration of the end stop element 8, 18 is adapted to the geometry of the counter stop element 10 on the swivel arm side. In the present exemplary embodiment of FIG. 1, FIG. 3 and FIG. 5 two rounded counter stop elements 10 formed pin or web-like are provided on the swivel arm 16, both of which come to fully bear against the stop element 8 upon reaching of the opening position of the tank flap.

The end stop element 8 arranged on the trough body side is injection-molded on to the inside of the hinge housing section 15. This injection-molding-on can preferentially take place in one operation with the injection-molding-on of the sealing lip 6 on the flange section 14 of the trough body 2. Merely suitable adaptation of the injection-mold is required to do so.

By means of an overflow channel formed in the mold the comparatively soft and noise-dampening material intended for the sealing lip 6 and the end stop element 8, 18 can be equally molded on to the outer and inner sides of the trough body 2. Such manufacture and assembly of an interior end stop element 8 can be affected almost cost-neutrally. It can be integrated in the trough body 2 and in a respective production cycle with a sealing lip 6 that has to be attached on the trough body 2 anyhow.

Furthermore, through the specifically geometrical configuration of the counter stop element 10, particularly its thickness and through the interaction of end stop element 8, 18 on the trough body side and counter stop element 10 on the swivel arm side an opening movement of the tank flap 9 can be limited in a noise dampening manner.

In the top view according to FIG. 4 seen from the vehicle inside, the hinge housing section 15 provided next to the through-opening is noticeable in comparison with the pot-shaped basic geometry of the remaining trough body 2. The end stop element 8, 18 always shown in cross section in the remaining figures can, according to the geometrical configuration of the counter stop elements 10 provided on the swivel arm 16, extend over almost the entire vertical extension of the hinge housing section 15, i.e., parallel to the axis of rotation 11 (i.e., swivel axis).

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A tank flap module for installation in a motor vehicle, comprising:

a trough body having a bottom section in a final assembly position on the motor vehicle located on an inside, the trough body in the bottom section including a flange section which in the final assembly position on the motor vehicle comes to lie in a mounting opening of a body panel that is provided with a sealing lip;

a through-opening for a fuel filler neck;

a mounting section for a swivel-mounting of a swivel arm of a tank flap arranged laterally thereto, wherein the swivel arm is swivel-mounted on the trough body between two end positions, wherein on an inner side of the mounting section a noise-dampening end stop element is arranged that interacts with the swivel arm or a counter stop element arranged thereon, and the noise-dampening end stop element and the sealing lip are embodied of one piece.

2. The tank flap module according to claim 1, wherein the noise-dampening end stop element is joined with the trough body.

3. The tank flap module according to claim 1, wherein the noise-dampening end stop element is integrated flush with a surface in the inside of the mounting section.

4. The tank flap module according to claim 1, wherein the noise-dampening end stop element and the counter stop element or the swivel arm are produced of different materials.

5. The tank flap module according to claim 1, wherein the noise-dampening end stop element is injection-molded on to the inside of the mounting section.

6. The tank flap module according to claim 1, wherein the trough body is formed as injection-molding component.

7. The tank flap module according to claim 1, wherein the noise-dampening end stop element is produced of a thermoplastic elastomer.

8. The tank flap module according to claim 1, wherein the noise-dampening end stop element comprises ethylene-propylene-diene-rubber (EPDM).

9. The tank flap module according to claim 1, wherein the noise-dampening end stop element, the sealing lip or the trough body can be produced by means of a two or multi-component injection-molding process.

\* \* \* \* \*